US009017552B2

(12) United States Patent
Peters, Jr. et al.

(10) Patent No.: US 9,017,552 B2
(45) Date of Patent: Apr. 28, 2015

(54) GARDEN RUNOFF TREATMENT SYSTEM

(76) Inventors: John Peters, Jr., Manorville, NY (US); John E. Markee, Selden, NY (US)

(*) Notice: Subject to any disclaimer, the term of this patent is extended or adjusted under 35 U.S.C. 154(b) by 217 days.

(21) Appl. No.: 13/495,676

(22) Filed: Jun. 13, 2012

(65) Prior Publication Data

US 2012/0312736 A1 Dec. 13, 2012

Related U.S. Application Data

(60) Provisional application No. 61/496,198, filed on Jun. 13, 2011.

(51) Int. Cl.
| B01D 29/00 | (2006.01) |
| A01G 9/14 | (2006.01) |
| A47F 7/00 | (2006.01) |
| C02F 1/28 | (2006.01) |
| C02F 101/10 | (2006.01) |
| A47G 7/04 | (2006.01) |

(52) U.S. Cl.
CPC .............. *A01G 9/1423* (2013.01); *C02F 1/288* (2013.01); *C02F 2101/105* (2013.01); *A47F 7/0078* (2013.01); *A47G 7/041* (2013.01)

(58) Field of Classification Search
CPC .... A01G 9/1423; A47F 7/0078; A47G 7/041; C02F 1/281; C02F 1/288; C02F 2101/105; C02F 2101/163; B01J 20/06
USPC ............ 210/170.03, 251, 316, 317, 484, 496, 210/498, 502.1, 505, 508, 903, 906, 250, 210/293, 455, 477; 47/66.6, 71
See application file for complete search history.

(56) References Cited

U.S. PATENT DOCUMENTS

| 5,124,044 | A | * | 6/1992 | Cassidy et al. | 210/683 |
| 5,997,747 | A | * | 12/1999 | Jowett | 210/670 |
| 8,303,811 | B1 | * | 11/2012 | Mihlbauer | 210/167.25 |
| 2010/0140159 | A1 | * | 6/2010 | Vaeth | 210/248 |
| 2011/0309036 | A1 | * | 12/2011 | Hussam et al. | 210/767 |
| 2012/0255226 | A1 | * | 10/2012 | Salen | 47/71 |

* cited by examiner

*Primary Examiner* — Matthew O Savage
(74) *Attorney, Agent, or Firm* — Michael I. Kroll

(57) ABSTRACT

A system for treating runoff water from a plastic container includes a tray having at least one drainage hole defined in a lower surface thereof. Remediation media is positioned within the tray for absorbing at least one nutrient from the runoff water. A container support member may be connected to the tray for supporting a number of potted plants above the space within the tray that is occupied by the remediation media.

18 Claims, 3 Drawing Sheets

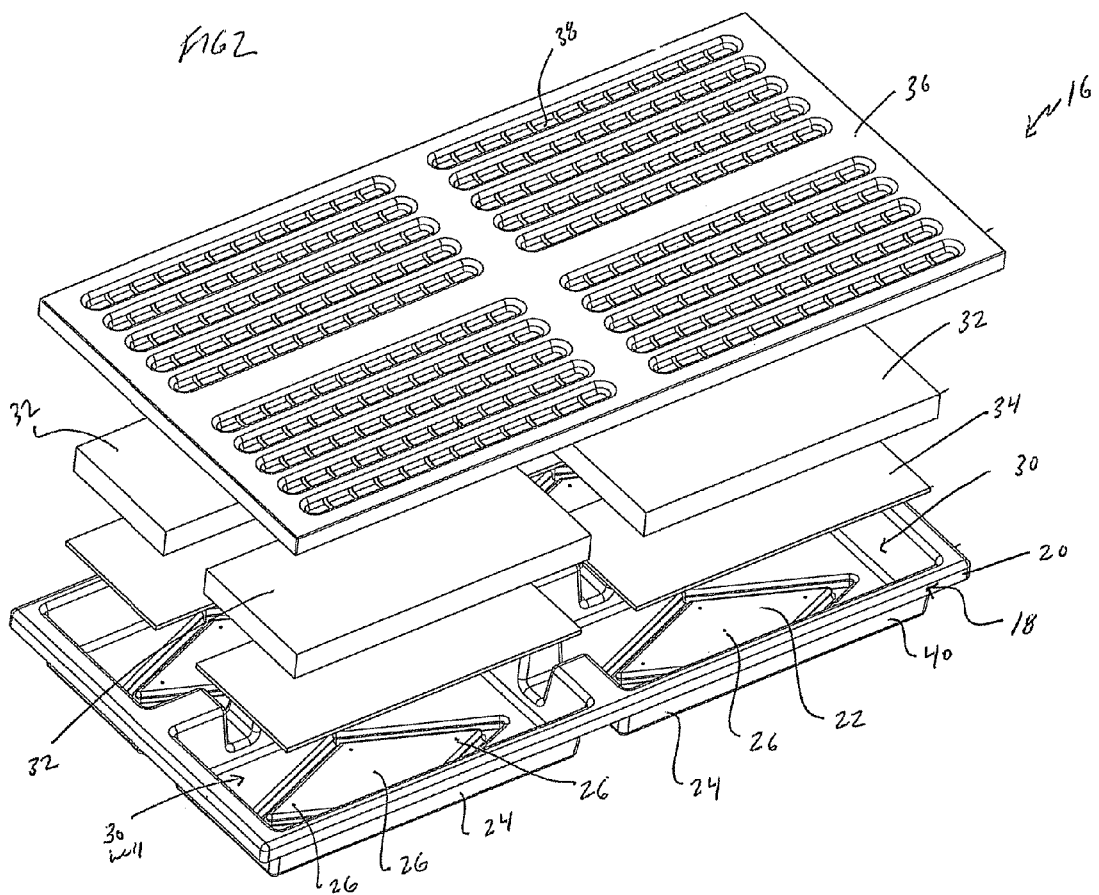

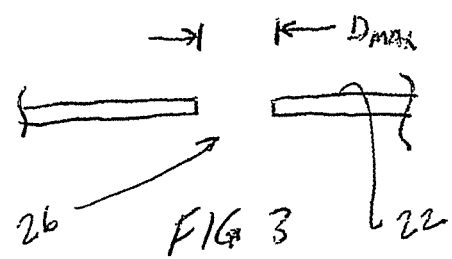

GARDEN RUNOFF TREATMENT SYSTEM

This is a non-provisional of U.S. Provisional Patent Application 61/496,198, filed Jun. 13, 2011, the entire disclosure of which is incorporated by reference as if set forth fully herein.

BACKGROUND OF THE INVENTION

1. Field of the Invention

This invention relates to systems and methods for growing plants and displaying them for retail. Specifically, the invention relates to the remediation of wastewater that is created during the use of such systems.

2. Description of the Related Technology

House and garden plants that are sold at retail are typically raised after germination in containers that have drainage holes for permitting excess water to escape. The containers are typically held for transportation and retail display by trays that are made of a perforated mesh material to permit water drainage.

Plants are commonly watered in garden centers using a hose, which often results in runoff of excess water into the ground or from a drainage system that is integrated into the retail facility. In some garden center facilities, an irrigation system consisting of an overhead pipe is used to water the plants. Water runoff from such facilities usually contains high levels of nutrients such as phosphates and nitrates. In the United States, the Environmental Protection Agency has issued warnings to garden centers for releasing nutrient rich effluent out of their facilities.

Unfortunately, there are few practical ways for such retailers to economically reduce the nutrient content of the wastewater that is generated from plant display runoff.

A need exists to provide a system and method for remediating runoff in facilities such as greenhouses and garden centers that can be inexpensively deployed by employees and that is effective in removing nutrient rich effluents from the runoff water.

SUMMARY OF THE INVENTION

Accordingly, it is an object of the invention to provide a system and method for remediating runoff in facilities such as greenhouses and garden centers that can be inexpensively deployed by employees and that is effective in removing nutrient rich effluents from the runoff water.

In order to achieve the above and other objects of the invention, a system for treating runoff water from a planter container includes a tray having at least one drainage hole defined in a lower surface thereof and remediation media positioned within the tray. The remediation media is constructed and arranged to absorb at least one nutrient from the runoff water.

A system for treating runoff water from a planter container according to a second aspect of the invention includes a planter container having a container drainage hole and a tray having at least one tray drainage hole defined in a lower surface thereof. The system further includes a container support member that is connected to an upper portion of the tray. The planter container is supported on the container support member. The container support member further has a plurality of openings for permitting runoff water from the first drainage hole to pass into the tray. Remediation media is positioned within the tray. The remediation media is constructed and arranged to absorb at least one nutrient from the runoff water.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is an exploded isometric view of the system that is shown in FIG. 1; and

FIG. 3 is a fragmentary view showing structure defining a drainage hole in the system that is shown in FIG. 1.

DETAILED DESCRIPTION OF THE PREFERRED EMBODIMENT(S)

Figure 1:
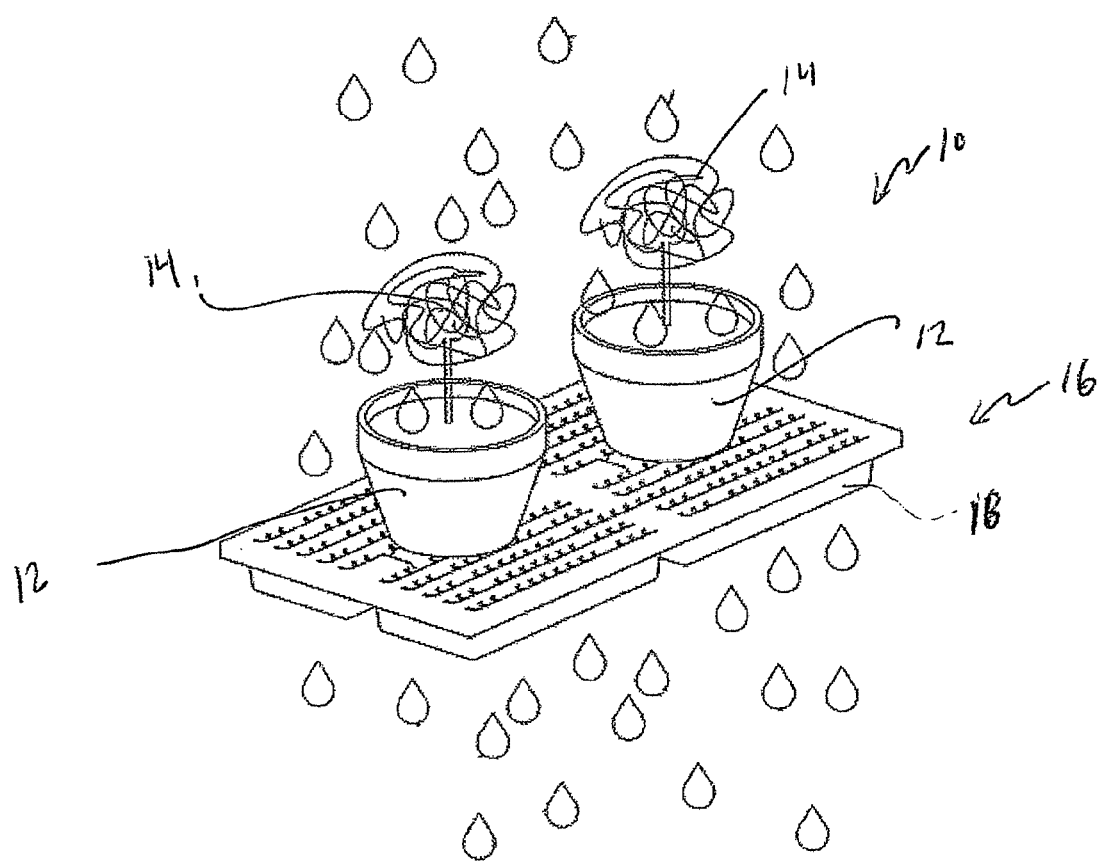
FIG. 1 is a diagrammatical depiction of a system for treating runoff water from a planter container according to a preferred embodiment of the invention.

Referring now to the drawings, wherein like reference numerals designate corresponding structure throughout the views, and referring in particular to FIG. 1, a system 10 for treating runoff water from a planter container may include a plurality of planter containers 12, each of which has a container body defining a space in which one or more plants 14 are positioned to grow. Each of the planter containers 12 will, as is typical, include soil, which may include fertilizers that are rich in nutrients such as nitrates. Each of the planter containers 12 also will have at least one container drainage hole for permitting excess water to drain from the container 12.

System 10 further includes a tray assembly 16 having a tray 18, which may be molded from a plastic material such as polystyrene, polyethylene or polypropylene. The preferred material is polystyrene. Referring to FIG. 2, tray 18 may have a peripheral gripping flange 20 that defines a gripping ledge to permit the tray 18 to be conveniently lifted and moved by employees at a facility such as a garden center.

Tray 18 preferably defines a lower surface 22, which is preferably constructed to be watertight except for the provision of a limited number of drainage holes 26, which will be discussed in greater detail below. Tray 18 further includes a plurality of support feet 24 for elevating the portions of the lower surface 22 in which the drainage holes 26 are defined, so that drainage of runoff water from within the tray 18 to an underlying surface is unimpeded.

In the preferred embodiment, tray 18 is configured so as to include a plurality of wells 30. Each of the wells 30 is substantially rectangular in shape and defines a space for receiving remediation media 32 that is constructed and arranged to remove at least one nutrient from runoff water that collects within the tray 18.

As FIG. 2 shows, a piece of filtration fabric 34 may be placed between a lower surface of the remediation media 32 and the lower surface 22 of the tray 18 within each of the wells 30. The purpose of the filtration fabric 34 is to intercept particulate matter that might otherwise impede passage of runoff water through the drainage holes 26. The filtration fabric 34 may also include an antimicrobial and/or mold inhibiting material to inhibit the growth of mold and pathogens within the tray 18. In the preferred embodiment, the filtration fabric 34 is fabricated from lipophilic recycled synthetic fibers, such as are commercially available from UltraTech International Inc. of Jacksonville Fla. under the registered trademark ULTRA-X-TEX®.

The tray assembly 16 further preferably includes a container supporting member 36 that is attached to the gripping flange 20 of the tray 18. In the preferred embodiment, the container supporting member 36 is permanently attached to the tray 18. Alternatively, the container supporting member may be removably mounted to the gripping flange 20 so as to permit access to the interior of the tray 18. In this alternative embodiment, the remediation media 32 and filtration fabric 34 may be periodically replaced by service personnel or employees of the garden center.

The container supporting member 36 has a number of openings 38 defined in a substantially flat horizontal upper surface thereof for permitting runoff water from the containers 12 to enter the tray 18. The planter containers 12 are supported on the meshed upper surface of the container supporting member 36.

Tray 18 further has sidewalls 40 that are constructed so as to be watertight in order to permit runoff water to collect within the tray 18 to a predetermined water retention level. This permits the remediation media to effectively remove nutrients from the runoff water while it is temporarily held within the tray 18.

The remediation media 32 is preferably embodied as a porous, nutrient absorbing pad that is impregnated with a remediation material for removing at least one nutrient from the runoff water that collects within the well 30 in which the remediation media 32 is positioned. Preferably, the remediation material is formulated to remove phosphates from the runoff water. The preferred remediation material is ferric oxide. Such a material is commercially available from Fabco Industries Inc. of Bohemia, N.Y. as PABPHOS® Filtration Media. It includes a fibrous mat made of a synthetic base material that is impregnated with ferric oxide.

It is important that drainage from the tray 18 be controlled in order to maximize the exposure of the runoff water to the remediation media 32, while minimizing the possibility of the runoff water overflowing from the tray 18. Accordingly, the number and size of drainage holes 26 relative to the volume within the tray 18 is important for the optimization of removal of nutrients from the runoff water.

Preferably, a plurality of drainage holes 26 are defined in the lower surface 22 within each of the wells 30. In the preferred embodiment, five drainage holes 26 are provided within each of the wells 30. Each of the drainage holes 26 is preferably substantially circular in transverse cross-section and defines a transverse cross-sectional area. Preferably, the drainage holes 26 are of uniform size and shape and have a maximum lateral dimension $D_{MAX}$ that is substantially within a range of about 0.02 inch to about 0.1 inch. More preferably, the maximum lateral dimension $D_{MAX}$ is substantially within a range of about 0.04 inch to about 0.08 inch.

Preferably, a ratio of the total volume defined by the tray 18 to the total cross-sectional area defined by the drainage holes 26 is substantially within a range of about 2000 inches to about 15,000 inches, more preferably substantially within a range of about 3500 inches to about 12,000 inches and most preferably substantially within a range of about 4500 inches to about 8000 inches.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for treating runoff water from a planter container, comprising:
    a tray having at least one drainage hole defined in a lower surface thereof;
    remediation media positioned within the tray, the remediation media being constructed and arranged to absorb at least one nutrient from the runoff water;
    a container support member connected to the tray for supporting a planter container; and
    a planter container supported on the container support member, the planter container having a container body and at least one drainage hole defined therein.

2. A system for treating runoff water from a planter container according to claim 1, wherein the tray includes at least one support foot for elevating the drainage hole with respect to an underlying surface.

3. A system for treating runoff water from a planter container according to claim 1, wherein the remediation media comprises a phosphate absorbing material.

4. A system for treating runoff water from a planter container according to claim 3, wherein the phosphate absorbing material comprises ferric oxide.

5. A system for treating runoff water from a planter container according to claim 1, wherein the remediation media comprises an absorbent pad having a nutrient absorbing material impregnated therein.

6. A system for treating runoff water from a planter container according to claim 5, wherein the nutrient absorbing material comprises ferric oxide.

7. A system for treating runoff water from a planter container according to claim 5, wherein the absorbent pad comprises a nonwoven material.

8. A system for treating runoff water from a planter container according to claim 1, wherein the drainage hole has a maximum lateral dimension that is substantially within a range of about 0.02 inch to about 0.1 inch.

9. A system for treating runoff water from a planter container according to claim 8, wherein the drainage hole has a maximum lateral dimension that is substantially within a range of about 0.04 inch to about 0.08 inch.

10. A system for treating runoff water from a plastic container according to claim 8, wherein a plurality of the drainage holes are defined in the lower surface of the tray.

11. A system for treating runoff water from a plastic container according to claim 1, wherein the tray has sidewalls defining a height, and wherein the height is substantially within a range of about 1 inch to about 4 inches.

12. A system for treating runoff water from a plastic container according to claim 1, wherein a ratio of the total volume defined by the tray to the total cross-sectional area defined by the drainage holes is substantially within a range of about 2000 inches to about 15,000 inches.

13. A system for treating runoff water from a plastic container according to claim 12, wherein a ratio of the total volume defined by the tray to the total cross-sectional area defined by the drainage holes is substantially within a range of about 3500 inches to about 12,000 inches.

14. A system for treating runoff water from a planter container, comprising:
    a planter container having a container drainage hole;
    a tray having at least one tray drainage hole defined in a lower surface thereof;

a container support member connected to an upper portion of the tray, the planter container being supported on the container support member, the container support member further having a plurality of openings for permitting runoff water from the first drainage hole to pass into the tray; and remediation media positioned within the tray, the remediation media being constructed and arranged to absorb at least one nutrient from the runoff water.

15. A system for treating runoff water from a planter container according to claim 14, wherein the tray includes at least one support foot for elevating the drainage hole with respect to an underlying surface.

16. A system for treating runoff water from a planter container according to claim 14, wherein the remediation media comprises a phosphate absorbing material.

17. A system for treating runoff water from a planter container according to claim 16, wherein the phosphate absorbing material comprises ferric oxide.

18. A system for treating runoff water from a planter container, comprising:

a tray having at least one drainage hole defined in a lower surface thereof;

remediation media positioned within the tray, the remediation media being constructed and arranged to absorb at least one nutrient from the runoff water, and wherein the tray includes at least one support foot for elevating the drainage hole with respect to an underlying surface.

* * * * *